(12) United States Patent
Kanai et al.

(10) Patent No.: US 7,597,992 B2
(45) Date of Patent: Oct. 6, 2009

(54) FILM COVERED ELECTRICAL DEVICE, FRAME MEMBER, AND HOUSING SYSTEM FOR FILM COVERED ELECTRICAL DEVICE

(75) Inventors: Takeshi Kanai, Sagamihara (JP); Hisako Nakano, Sagamihara (JP)

(73) Assignees: NEC Lamilion Energy, Ltd, Kanagawa (JP); Fuji Jukogyo Kabushiki Kaisha, Tokyo (JP)

(*) Notice: Subject to any disclaimer, the term of this patent is extended or adjusted under 35 U.S.C. 154(b) by 270 days.

(21) Appl. No.: 11/547,201

(22) PCT Filed: Mar. 30, 2005

(86) PCT No.: PCT/JP2005/006081

§ 371 (c)(1),
(2), (4) Date: Sep. 29, 2006

(87) PCT Pub. No.: WO2005/096412

PCT Pub. Date: Oct. 13, 2005

(65) Prior Publication Data

US 2008/0171259 A1 Jul. 17, 2008

(30) Foreign Application Priority Data

Mar. 31, 2004 (JP) ............................. 2004-107383

(51) Int. Cl.
*H01M 2/12* (2006.01)
*H01M 2/02* (2006.01)
*H05K 7/20* (2006.01)

(52) U.S. Cl. ............................ 429/53; 361/691; 429/169
(58) Field of Classification Search ................. 429/154
See application file for complete search history.

(56) References Cited

U.S. PATENT DOCUMENTS

| | | | | |
|---|---|---|---|---|
| 3,871,921 A | * | 3/1975 | Beatty et al. | 429/136 |
| 4,882,242 A | * | 11/1989 | Kilb et al. | 429/154 |
| 6,743,546 B1 | | 6/2004 | Kaneda et al. | |
| 2003/0031920 A1 | * | 2/2003 | Hoffman et al. | 429/66 |
| 2004/0050414 A1 | * | 3/2004 | Oogami | 136/249 |
| 2005/0231158 A1 | * | 10/2005 | Higashino | 320/112 |

FOREIGN PATENT DOCUMENTS

| | | |
|---|---|---|
| JP | 11-176400 A | 7/1999 |
| JP | 2001-93497 A | 4/2001 |
| WO | WO 00/59063 A | 10/2000 |

* cited by examiner

*Primary Examiner*—Dah-Wei D Yuan
*Assistant Examiner*—Edu E Enin-Okut
(74) *Attorney, Agent, or Firm*—Sughrue Mion, PLLC

(57) ABSTRACT

Disclosed is a laminate cell (1) comprising an electric power generating element (2) and a laminate film (7) so arranged as to surround the electric power generating element (2). The laminate cell (1) further comprises a frame member (10) which surrounds and holds the electric power generating element (2) and has a first portion (10*f*) with a thickness larger than that of the electric power generating element (2).

16 Claims, 7 Drawing Sheets

FILM COVERED ELECTRICAL DEVICE, FRAME MEMBER, AND HOUSING SYSTEM FOR FILM COVERED ELECTRICAL DEVICE

This application claims priority from PCT Application No. PCT/JP2005/006081 filed Mar. 30, 2005, and from Japanese Patent Application No. 2004-107383 filed Mar. 31, 2004, which applications are incorporated herein by reference.

TECHNICAL FIELD

The present invention relates to a film covered electric device, a frame member, and a housing system for a film covered electric device.

BACKGROUND ART

In recent years, an electric automobile or a hybrid electric automobile (hereinafter, simply called "electric automobile") mounted with a battery for driving a motor has been rapidly developed. The battery mounted on the electric automobile is required as a matter of course to have reduced weight in order to improve drivability and mileage per charge. In order to reduce battery weight, a film covered battery has been developed using a laminate material formed into a thin film by laminating a metal layer, like aluminum, and a thermal-melt resin layer through an adhesive layer on the covering body. The laminate material generally has a structure, in which both surfaces of the thin metal layer, like aluminum, are covered with thin resin layers, and is resistant to acid and alkali and is lightweight and flexible.

Generally, the property of the battery is influenced by the expansion and contraction of the active materials of the cathode and anode during charge/discharge. Therefore, conventionally, the battery is housed in a metal container in order to prevent deformation.

On the other hand, in the film covered batteries, laminate film used as the covering is not able to suppress expansion of the battery. Therefore, batteries that are covered with laminate films are configured such that a proper load is placed on the battery in order to suppress expansion of the electrodes. As the method of suppressing the expansion of the battery, Japanese Patent Laid-Open No. 10-012278 discloses the technique in which an electric power generating element including a group of laminated electrodes is stored in a holding member having a U-shape in a cross section and having a plurality of projections on two inner surfaces that are face each other.

Also, when the film covered battery is mounted on an electric automobile, it is necessary to address the problems concerning protection from impact and or using as an assembled battery etc. As a method of protecting the cell element from external impact, Japanese Patent Laid-Open No. 2000-357493 discloses a battery frame in which the battery elements are housed in a box-shaped frame.

DISCLOSURE OF INVENTION

However, the technique for applying pressure to the electric generating element by the holding member which has a plurality of projections had a problem in which the life of the power generation element will differ in the part where pressure is applied by the holding member, and in the part where no pressure is applied. Specifically, when local deterioration occurs in the electrodes that comprise the electric generating element because of the non-uniform application of pressure, the life of the battery is determined by the life of the most-deteriorated portion and is shortened even though there is a portion that has not been deteriorated.

In order to suppress the non-uniform application of pressure, even if it applies uniform pressure to the entire surface of the electric generating elements by using an elastic member, it is difficult to achieve uniformly, and non-uniformly will occur.

Also, when a battery is stacked and used as an assembled battery, conventionally, electric generating element portions are often stacked and laminated. In this case, pressure applied to the battery arranged at the lower layer is different from the pressure applied to the cell arranged at the upper layer.

On the other hand, in order to solve the problem for protecting the battery element against the damage from an external impact, the method of housing the battery element in a box is preferable in terms of protecting it from impact. However, according to this method, a box to cover the entire surface of the battery element is prepared for each battery and is formed into an assembled battery to be mounted on the electric automobile, and therefore, this causes new problems in that there is about an increase in weight, an increase in occupied volume, and a lowering of the cooling characteristics.

Now, according to the studies by the inventors, in order to extend battery life, it was found that to apply a low pressure to the surface is more advantageous than to suppress the expansion of the battery by applying a high pressure to the battery.

Accordingly, the present invention has as an object to provide a film covered electric device, a frame member, and a housing system for a film covered electrical device that can apply a uniform pressure to electric generating elements although they are stored in a container as an assembled battery.

To attain the above object, a film covered electric device according to the present invention, comprises an electrical device element and a covering film arranged so as to surround the electrical device element, comprising:

a frame member which surround and holds the electrical device element and which has a first portion having a thickness larger than that of the electrical device element.

As described above, since the film covered electric device has the frame member having the first portion with the thickness larger than the thickness of the electrical device element, the first portions of frame members can be abutted and stacked when being stacked to form an assembled battery. Therefore, even it being formed into the assembled battery, the electrical device element can be held only while the even atmosphere pressure is applied to the electrical device element. Accordingly, shortened battery life, which is caused by the application of non-uniform pressure to the electrical device element, can be prevented.

Also, the frame member does not cover the power generating element like a box but surrounds the periphery of the power generating element to hold the power generating element. When a box member is used, the box member covers the entire power generating element to cause an increase in weight. However, since the frame portion of the present invention surrounds only the peripheral portion of the power generating element, the increase in weight can be suppressed.

The frame portion of the film covered electric device according to the present invention may be arranged in the covered film, and in this case, the film covered electric device and the frame member can be handled together. Also, the frame member of the film covered electric device according to the present invention may be positioned on the exterior of the covering film. In this case, the frame member can be attached and detached to/from the film covered electric device, as necessary.

Also, the frame member of the film covered electric device according to the present invention may have a second portion that has a thickness thinner than that of the first portion. In this case, when being stacked to form an assembled battery, the second portion can be used as a ventilation orifice and deterioration in heat radiation characteristics, caused by laminating the cells can be prevented.

Also, an electrode that extends from the electrical device element may be fixed to the frame member of the film covered electric device according to the present invention.

Also, the frame member of the film covered electric device according to the present invention may be divided frame members that hold an electrode by, or when the frame member is positioned on the exterior of the covered film, the opposite-surfaces of the covered film may be heat-sealed around the electrical device element, whereby the divided frame members may hold a heat-sealed area for sealing the electrical device element.

Also, the frame member of the film covered electric device according to the present invention may have a guide portion for leading a gas that is emitted when internal pressure in an area sealed by the covered film is released. In this case, when the internal pressure in the area sealed by the covered film rises due to some abnormality and the gas is emitted through the safety valve, the gas can be leaded into a predetermined direction.

A frame member of the present invention that is used to fix a film covered electric device, having an electrical device element and a covered film arranged so as to surround the electrical device element in a container, and that is attached to a peripheral portion of the film covered electric device, comprising:

a first portion having a thickness larger than that of the electrical device element.

Also, the frame member according to the present invention may have a second portion with a thickness thinner than that of the first portion. Further, the frame member according to the present invention may be divided to hold a sealing area that seals the electrical device element by thermally adhering opposite-surfaces of the covered film around the electrical device element. Further, the frame member according to the present invention may include a guide portion for introducing gas that is emitted when internal pressure in an area sealed by the covered film of the film covered electric device is released.

A housing system for a film covered electric device, for storing a plurality of film covered electric devices having an electrical device element and a covering film arranged so as to surround the electrical device element in a container:

wherein the film covered electric device having a frame member that surrounds and holds the electrical device element and has a first portion with a thickness larger than that of the electrical device element, and an assembled battery, formed by abutting an abutting portion of the frame member with a substantial thickness of the first portion and the abutting portion of the film covered electric device that is adjacent, and formed by stacking the film covered electric devices, is stored in the container.

In the housing system for the film covered electric device according to the present invention, when the film covered electric device is housed in the container as an assembled battery, the abutting portions of the frame members, having a thickness that is substantially the same as the thickness of the first portion of the frame member, are abutted and stacked. Therefore, according to the present invention, though electrical devices with film covering are stacked into an assembled battery, the electrical device element can be held only while even atmosphere pressure is applied. Specifically, according to the present invention, shortened battery life can be prevented as a result of the application of uniform pressure to the electrical device element.

In the film covered electric device according to the present invention, the frame member is positioned on the exterior of the covering film may have a guide portion for leading gas that is emitted when internal pressure in an area sealed by the covering film of the film covered electric device is released. And the container may have a duct which concentrates the gases led by the guide portion into at least one place and discharges the gases to the outside of the container. In this case, since the emitted gas can be exhausted outside the container in a predetermined direction, adverse effects of the gas on peripheral devices can be prevented.

Also, the container for the film covered electric device according to the present invention may have a duct at a position corresponding to each guide portion of the assembled battery including the film covered electric device, each of which has the guide portion at an identical position, and in particular, the container may have the duct at a side wall of the container.

Also, the container for the film covered electric device according to the present invention may have a lid having a pressing portion that presses the frame member of the assembled battery housed in the container toward the bottom of the container in which the assembled battery is mounted. Also, in the container for the film covered electric device according to the present invention, a plurality of projections made of resin and formed on a side wall of the container are each inserted into a plurality of holes, each of which corresponds to each of the projections, and each projection that projects from each hole is thermally caulked to fix the lid to the container. Further, a thermal caulk is performed while the pressing portion is pressed to the frame member by a predetermined pressure. In this case, since the frame member that holds the film covered electric device is pressed by the pressing portion and then is thermally caulked to be fixed, the film covered electric device can be fixed to the container with reliability and with ease.

As described above, according to the present invention, shortened life of the electrical device element, that is caused due to application of uneven pressure, can be prevented.

BEST MODE FOR CARRYING OUT THE INVENTION

Next, explanations are given of embodiments of the present invention with reference to drawings.

First Embodiment

Figure 1:
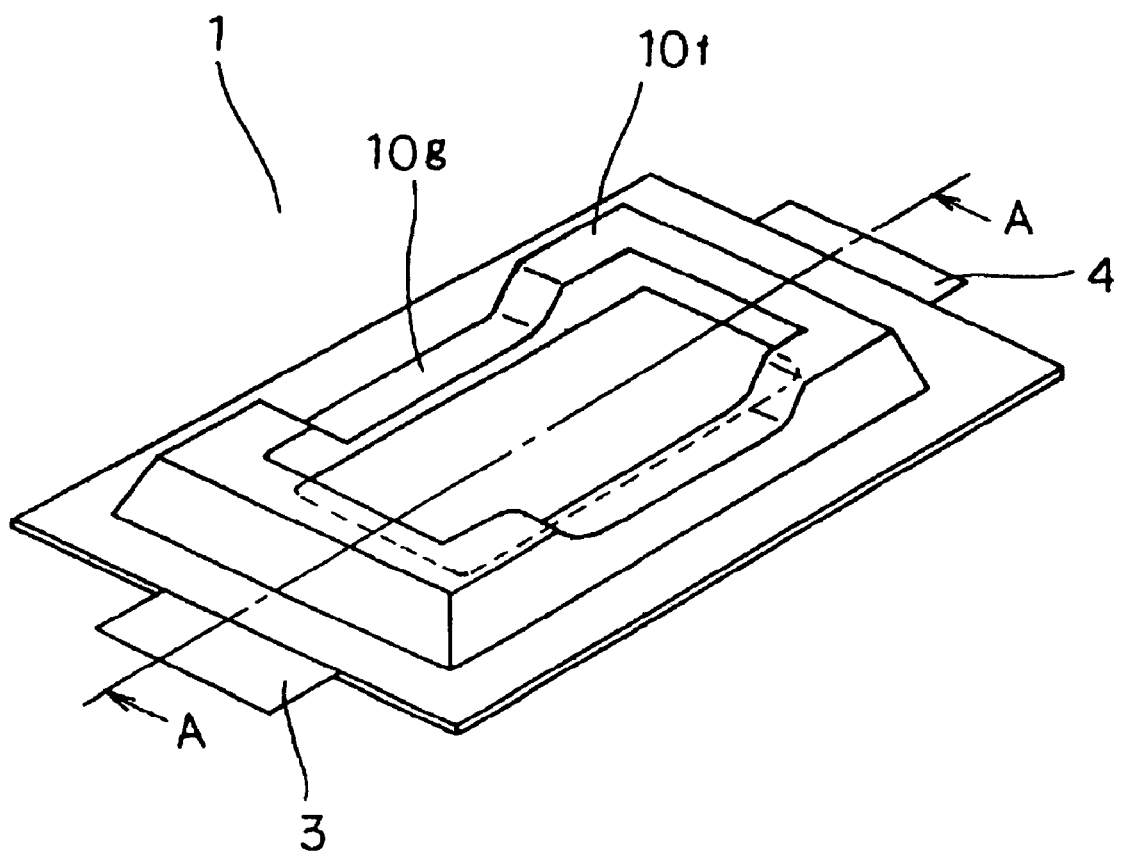
FIG. 1 is a perspective external view schematically showing a laminated battery of a first embodiment according to the present invention.
Figure 2:
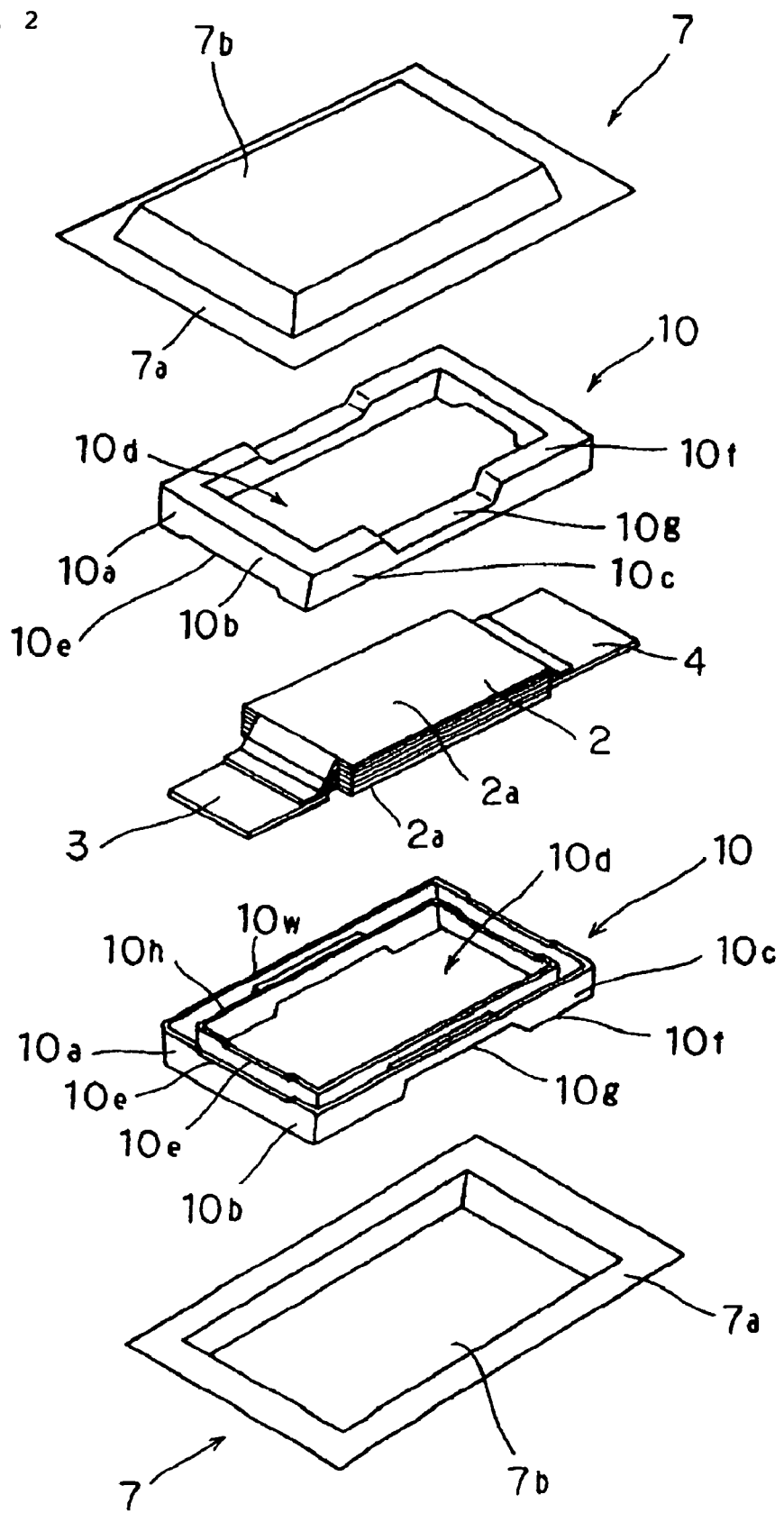
FIG. 2 is a perspective exploded view schematically showing the laminated battery shown in FIG. 1.

FIG. 1 is a perspective external view schematically showing a laminated battery of a first embodiment, and FIG. 2 is a perspective exploded view schematically showing the laminated battery according to the first embodiment.

Figure 3A:
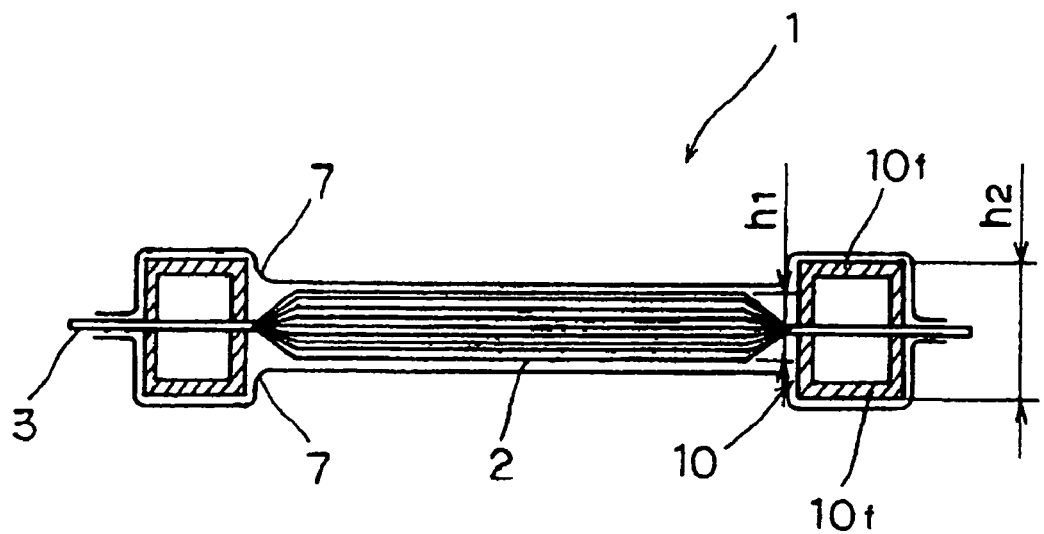
FIG. 3a is a cross-sectional view taken along line A-A in FIG. 1.
Figure 3B:
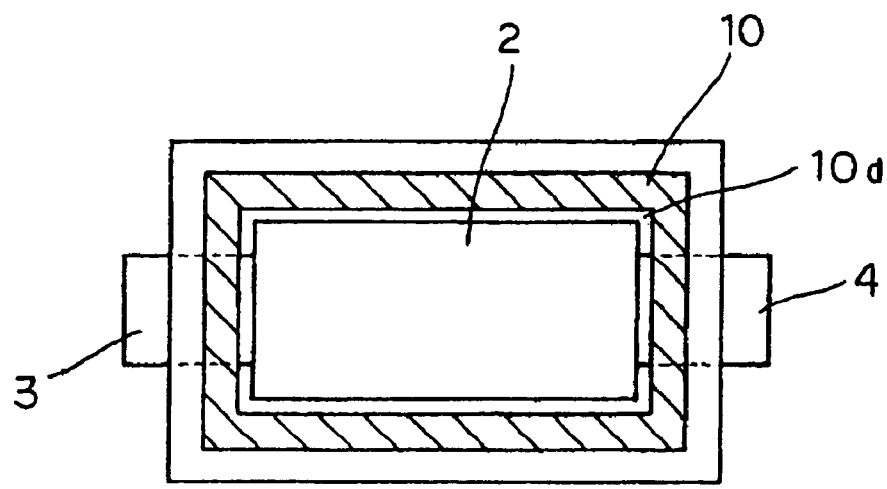
FIG. 3b is a plan perspective view of the laminated battery.

FIG. 3*a* is a cross-sectional view taken along line A-A in FIG. 1, and FIG. 3*b* is a plane perspective view of the laminated battery.

Laminated battery 1 has a structure in which electric generating element 2 having a cathode-side active electrode, an anode-side active electrode, and an electrolytic solution, and frame member 10 that is arranged to surround the periphery of electric power generating element 2 and has first portion 10*f* with a thickness larger than that of electric power generating element 2, are sealed by four sides of heat-sealed portion 7*a* of laminate film 7 formed by laminating a metal film, like aluminum, and a heat-sealed resin film.

Electric power generating element 2 in laminated battery 1 may be a laminate type including a cathode-side active electrode and an anode-side active electrode that are laminated with a separator, not shown, or a winding type in which a cathode-side active electrode and an anode-side active electrode in strip-shapes are laminated with a separator and are wound and then are compressed into a flat shape, whereby the cathode-side active electrode and the anode-side active electrode are alternately laminated.

Also, any electric power generating element 2 can be used for an ordinary battery as long as electric power generating element 2 is provided with a cathode, an anode, and an electrolyte. Electric power generating element 2 in a general lithium ion secondary battery is formed by opposing a cathode plate in which an active material, like a lithium and manganese compound oxide and lithium cobalt oxide, is applied to both sides of an aluminum foil or the like, and an anode plate in which a carbon material doped with lithium or dedoped is applied to both sides of a copper foil or the like, with a separator and impregnating it with the electrolytic solution including lithium salt. In addition to electric power generating element 2, that has been mentioned there are various kinds of chemical batteries, such as a nickel metal hydride battery, a nickel cadmium battery, a lithium metal primary battery or secondary battery, a lithium polymer battery. Further, the present invention is also available to an electric device in which an electric device element that may store electric energy inside and generate gas by a chemical reaction or a physical reaction, such as a capacitor element exemplified by a capacitor, e.g., an electric double layer capacitor or an electrolytic capacitor.

Cathode electrode terminal connected to the cathode side active electrode and anode electrode terminal 4 connected to the anode side active electrode are opposite to and extend from heat sealed portions 7*a* of laminated battery 1 in the lateral direction. Aluminum is often used as cathode electrode terminal 3, and copper or nickel is often used as anode electrode terminal 4 because of the electric characteristics thereof.

Frame member 10 is provided so that strong pressure will not be applied to main surface 2*a* of electric power generating element 2, i.e., the electrode surface, and so that a battery, that is formed into an assembled battery, can be held and fixed to a housing container or the like.

Frame member 10 can be divided in the direction of thickness of electric power generating element 2 and has two frame portions 10*a* that are mutually face each other and are joined.

Frame portion 10*a* is formed in a frame shape including short side portion 10*b* that corresponds to cathode electrode terminal 3 or anode electrode terminal 4, and long side portion 10*c* that corresponds to the longitudinal direction of electric power generating element 2. Specifically, frame portion 10*a* is configured so that electric power generating element 2 can be arranged in space 10*d* surrounded by four sides, i.e., short side portions 10*b* and long side portions 10*c*. Also, frame portion 10*a* is a hollow structure for weight reduction.

Short side portion 10*b* is formed with nipping portion 10*e* that holds electric power generating element 2 by extending cathode electrode terminal 3 and anode electrode terminal 4 to the outside and by nipping cathode electrode terminal 3 and anode electrode terminal 4.

When frame portions 10*a* are joined oppositely, ridge-line portions of rim portions 10*h* of frame portions 10*a* are mutually abutted, nipping portions 10*e* form a space that is slightly narrower than the thickness of cathode electrode terminal 3 or anode electrode terminal 4. Therefore, cathode electrode terminal 3 or anode electrode terminal 4 that is inserted into the space is held by nipping portions 10*e* and is fixed. Incidentally, FIG. 2 shows frame portion 10*a* in which nipping portions 10*e* are formed inside and outside short side portion 10*b*, however, the arrangement is not limited to this, for example, nipping portion 10*e* may be formed only at one side. Alternatively, nipping portions 10*e* may be configured by connecting inside and outside rim portions 10*h* to form a face, and the electrodes may be held by the face. Further, cathode electrode terminal 3 and anode electrode terminal 4 are provided with steps so that cathode electrode terminal 3 and anode electrode terminal 4 do not move in the inserted directions thereof, or nipping portion 10*e* may be provided with a non-slip member, like a rubber member.

Also, as shown in FIG. 2 and FIG. 3*a*, frame portion 10*a* has first portion 10*f* with a thickness larger than thickness $h_1$ of electric power generating element 2 and second portion 10*g* with a thickness smaller than that of first portion 10*f* by oppositely joining two frame portions 10*a* to form frame member 10. Second portion 10*g* may be thicker or thinner than thickness $h_1$ of electric power generating element 2 while two frame portions 10*a* are oppositely joined to provide frame member 10.

First portions 10*f* are arranged at both sides of short side portion 10*b* and long side portion 10*c*, and second portion 10*g* is arranged approximately at the center portion. Incidentally, there is no limitation on the arrangement of first portion 10*f* and second portion 10*g*, and any arrangement is available as long as atmospheric pressure can be applied to main surface 2*a* of electric power generating element 2 as a uniform pressure.

Specifically, as described later, first portion 10*f* may be arranged in any position, as long as, when laminated battery 1 is stacked, first portion 10*f* of frame portion 10 that holds electric power generating element 2 is abutted on first portion 10*f* of adjacent laminated battery 1 to hold each other and is positioned to apply a uniform atmospheric pressure so that main surfaces 2*a* of adjacent electric power generating element 2 are not in contact with each other.

Also, second portion 10g, as described later, is provided for ventilation so as not to inhibit radiation in each battery by stacking laminated battery 1. Therefore, second portion 10g may be arranged at any position as long as a cooling wind can be applied to electric power generating element 2 without inhibiting attainment of the purpose of first portion 10f.

Next, the process of manufacturing laminated battery 1 is roughly explained.

First, electric power generating element 2 is so positioned as to be arranged in space 10d of two frame portions 10a that are mutually opposite each other. Then, cathode electrode terminal 3 and anode electrode terminal 4 extending from electric power generating element 2 are placed and fixed between nipping portions 10e of two frame portions 10a that are mutually opposed. Frame portions 10a may be fixed by engaging an engagement claw of one frame portion 10a with an engagement hole of another frame portion 10a, or may be fixed by adhesive. Also, only a positioning projection of one frame portion 10a and a positioning hole of another frame portion 10a may be positioned, when frame portions 10a are fixed only to prevent a positional displacement.

Then, electric power generating element 2 and frame portion 10 that holds electric power generating element 2 are stored and put in cup portions 7a of two laminate films 7. Incidentally, the first embodiment shows an example in which cup portion 7b is used to store electric power generating element 2 and frame portion 10 is previously formed in each laminate film 7, however, laminate film 7 formed with no cup portion 7b in a sheet is also available.

Successively, cathode electrode terminal 3 and anode electrode terminal 4 are extended from heat-sealed portions 7a. Then, three sides among heat-sealed portions 7a of laminate film 7 are heat-sealed. After three sides are heat-sealed, vacuuming is performed. After vacuuming, one remaining side is heat-sealed, thereby electric power generating element 2 is sealed. Cup portion 7b of laminate film 7 is approximately deformed by close to first portion 10f and second portion 10g of frame member 10 and main surface 2a of electric power generating element 2.

Electric power generating element 2 of laminated battery 1, which is configured in this way, is held by nipping cathode electrode terminal 3 and anode electrode terminal 4 between two nipping portions 10e of frame portions 10a, and therefore no force for holding electric power generating element 2 is applied to main surface 2a of electric power generating element 2. Specifically, uniform pressure is applied to main surface 2a of electric power generating element 2 by atmosphere pressure. Therefore, there is no case in which the battery life of laminated battery 1 of the first embodiment is partially shortened due to the application of non-uniform pressure to the main surface of the electric power generating element which was the conventional problem that caused the shortening of battery life.

Also, since frame member 10 is arranged in laminate film 7, it can be treated as the battery in a unified manner, and management becomes easy.

Further, since frame portion 10 surrounds only the peripheral portion of electric power generating element 2, weight can be reduced as compared with the protection member in the box shape that covers the entire electric power generating element.

Figure 4:
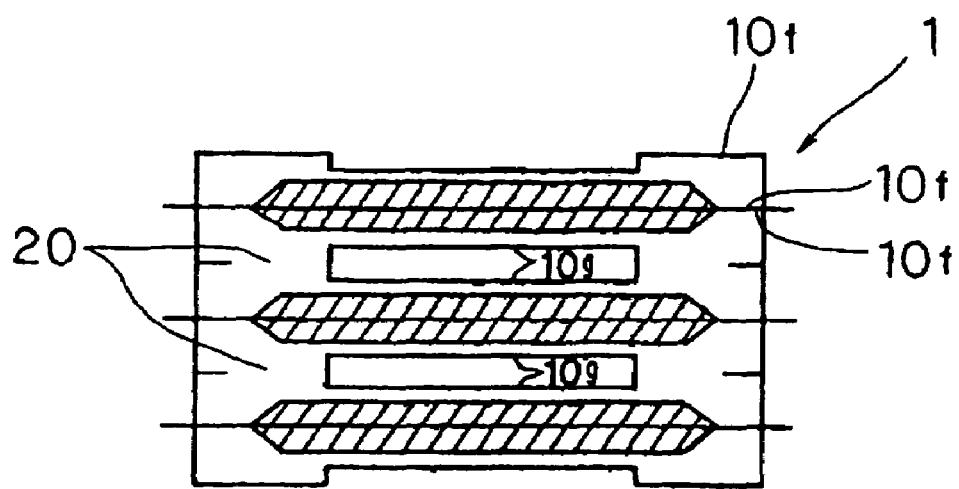
FIG. 4 is a side view schematically showing the arrangement in which laminated batteries of the first embodiment according to the present invention are laminated to form an assembled battery.
Figure 5:
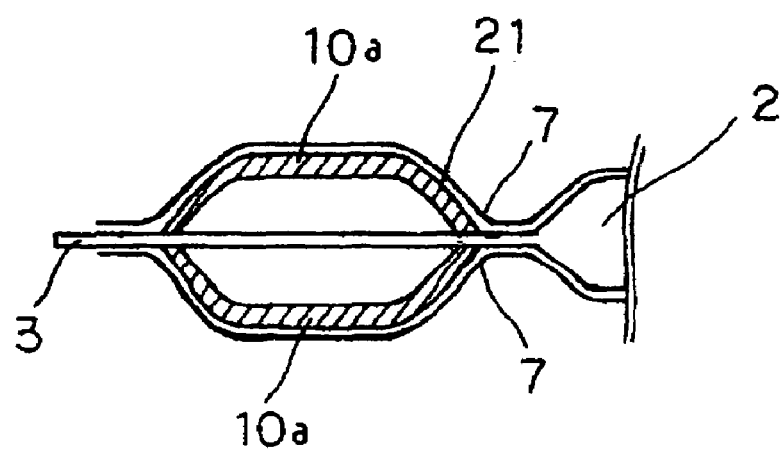
FIG. 5 is a cross-sectional view showing, another example of a frame member in a cross section.

Next, FIG. 4 is a side view schematically showing the arrangement in which the laminate batteries of the first embodiment are stacking to form an assembled battery.

As shown in FIG. 3a, thickness $h_2$ of first portion 10f of frame portion 10 is larger than thickness $h_1$ of electric power generating element 2. Therefore, laminated battery 1 that is stacked to form an assembled battery is stored in a housing case, not shown, so that first portions 10f are abutted. Laminated battery 1 is formed into an assembled battery, is stacked so that first portions 10f are abutted, and therefore uniform atmosphere pressure is applied to main surface 2a of electric power generating element 2. Also, since second portion 10g is formed to be thinner than thickness $h_2$ of first portion 10f, airflow orifice 20 is formed when the batteries are stacked. With this arrangement, since cooling wind can be applied to electric power generating element 2 through airflow orifice 20, electric power generating element 2 can be cooled with more efficiency.

Incidentally, the cross-section shape of frame portion 10a in frame member 10 is not limited to a rectangle, for example, shoulder portions 21 may be formed by gentle curves. In this case, applying a local large tension to laminate film 7 when sealed by laminate film 7 can be avoided.

Second Embodiment

Figure 6:
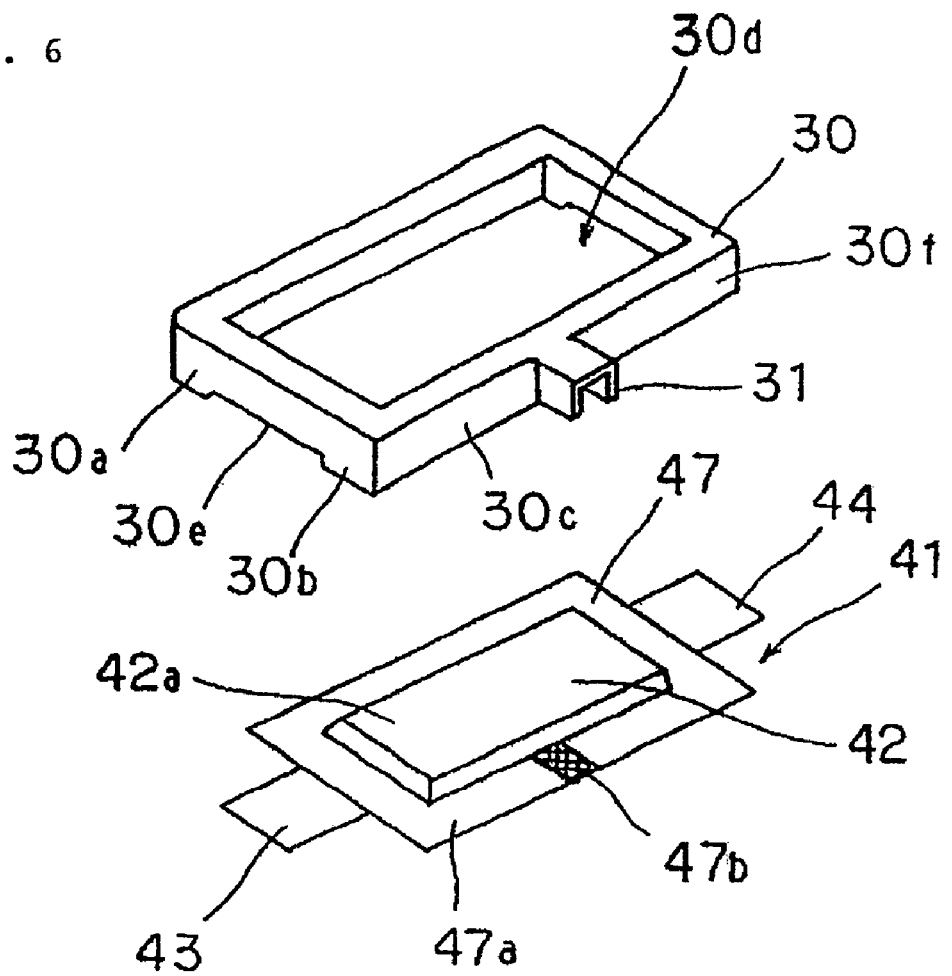
FIG. 6 is a perspective exploded view schematically showing a laminated battery of a second embodiment according to the present invention.
Figure 6:
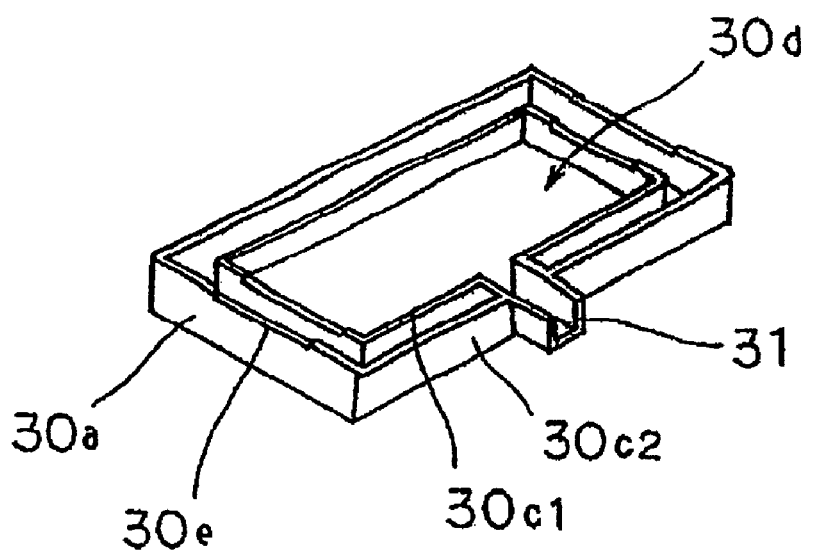

FIG. 6 is a perspective exploded view schematically showing a laminated battery of a second embodiment.

In the first embodiment, frame member 10 that holds electric power generating element 2 is sealed in laminate film 7 together with electric power generating element 2, whereas frame member 30 of the second embodiment is arranged outside laminate film 47.

Frame member 30 of the second embodiment has as its object preventing the local application of strong pressure to main surface 42a of electric power generating element 42 without causing an increase in weight, when the battery is held, similarly to frame member 10 of the first embodiment.

Therefore, the arrangement thereof is similar to that of frame member 10. Specifically, frame member 30 is arranged so as to surround the periphery of power electric generating element 42 and has first portion 30f with a thickness larger than that of electric power generating element 42. Frame member 30 can be divided in the thickness direction of electric power generating element 42 and has two frame portions 30a that are oppositely joined.

Frame portions 30a are oppositely joined to provide first portion 30f with a thickness larger than that of electric power generating element 42. Also, frame portion 30a is in the shape of a frame including short side portion 30b formed with nipping portion 30e that holds and fixes cathode electrode terminal 43 and anode electrode terminal 44 and long side portion 30c that corresponds to the longitudinal direction of electric power generating element 42. Frame portions 30a are formed so as to arrange electric power generating element 42 in space portion 30d surrounded by the four sides, i.e., short side portions 30b and long side portions 30c.

Incidentally, in the second embodiment, since frame member 30 is arranged outside laminate film 47, frame member 30 can be attached and detached as necessary.

Laminated battery 41 has safety valve 47b in heat-sealed portion 47a, however, since the other arrangements are similar to those of the first embodiment, detailed explanations are omitted.

Now, when a voltage that is out of the specification range is applied to the film covered battery, a case may occur in which gas is generated and internal battery pressure will rise due to electrolysis of the electrolytic solution. When the internal pressure of the film covered battery rises too much, the film expands, and finally, the covered material explodes, and gas is jetted from the position where the explosion occurred. However, since it is impossible to specify the position at which an explosion occurs, the situation is such that the peripheral device or the like will be adversely effected, depending on the location of the explosion. Laminated battery 41 is provided with safety valve 47b to avoid such a situation, and gas is discharged from safety valve 47b when the internal pressure rises.

However, though safety valve 47b can define the gas emission direction, it cannot introduce the emitted gas to the outside without adverse effects on the peripheral device or the like.

Then, frame portion 30a of the second embodiment is provided with exhaust guide 31 that introduces the gas emitted from the battery to the outside, in long side portion 30c. Exhaust guide 31 is formed by notching a part of inner wall 30c1 of long side portion 30c and by projecting a part of outer wall 30c2 of long side portion 30c, and space 30d and the outside of frame member 30a are connected. Exhaust guide 31 is formed at the position that corresponds to safety valve 47b arranged in laminated battery 41. Specifically, as shown in FIG. 6, in a situation in which safety valve 47b is arranged in heat-sealed portion 47a, when a portion of safety valve 47b is held by inner wall 30c1 or outer wall 30c2, there is a possibility that safety valve 47b will not open while internal pressure is released and gas cannot be released. Therefore, the position of safety valve 47b preferably corresponds to that of exhaust guide 31 so that the emitted gas can be introduced to the outside without inhibiting the function of safety valve 47b.

Also, preferably, exhaust guide 31 is formed at the same position in any frame portions 30. With this arrangement, when laminated battery 41 is stacked to form an assembled battery, the positions of exhaust guides 31 are aligned. Accordingly, exhaust guide 31 can be easily housed in duct 71, which will be described later.

Figure 7:
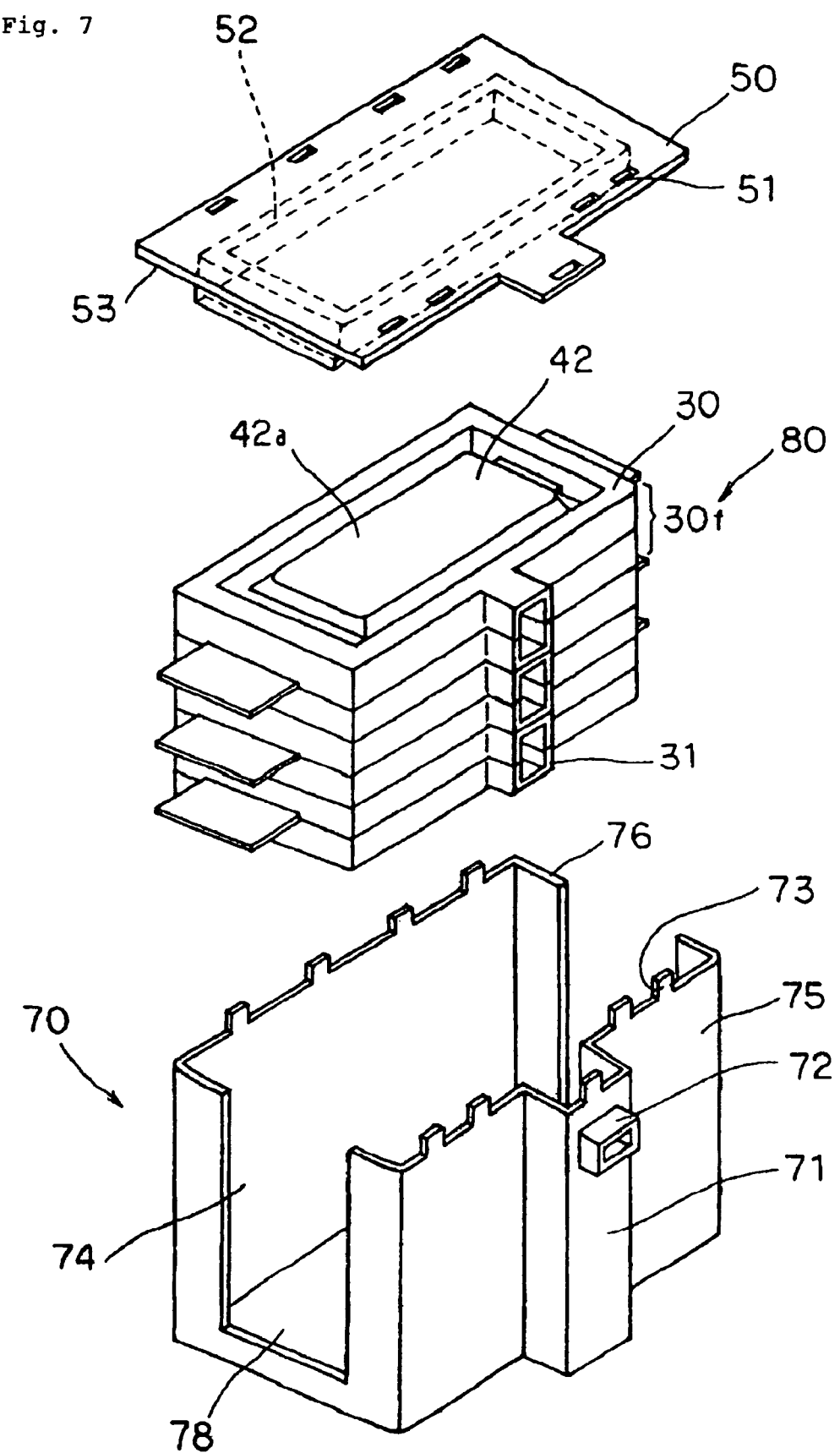
FIG. 7 is a perspective exploded view of a case that can house the laminated battery formed as an assembled battery of the second embodiment according to the present invention.
Figure 8:
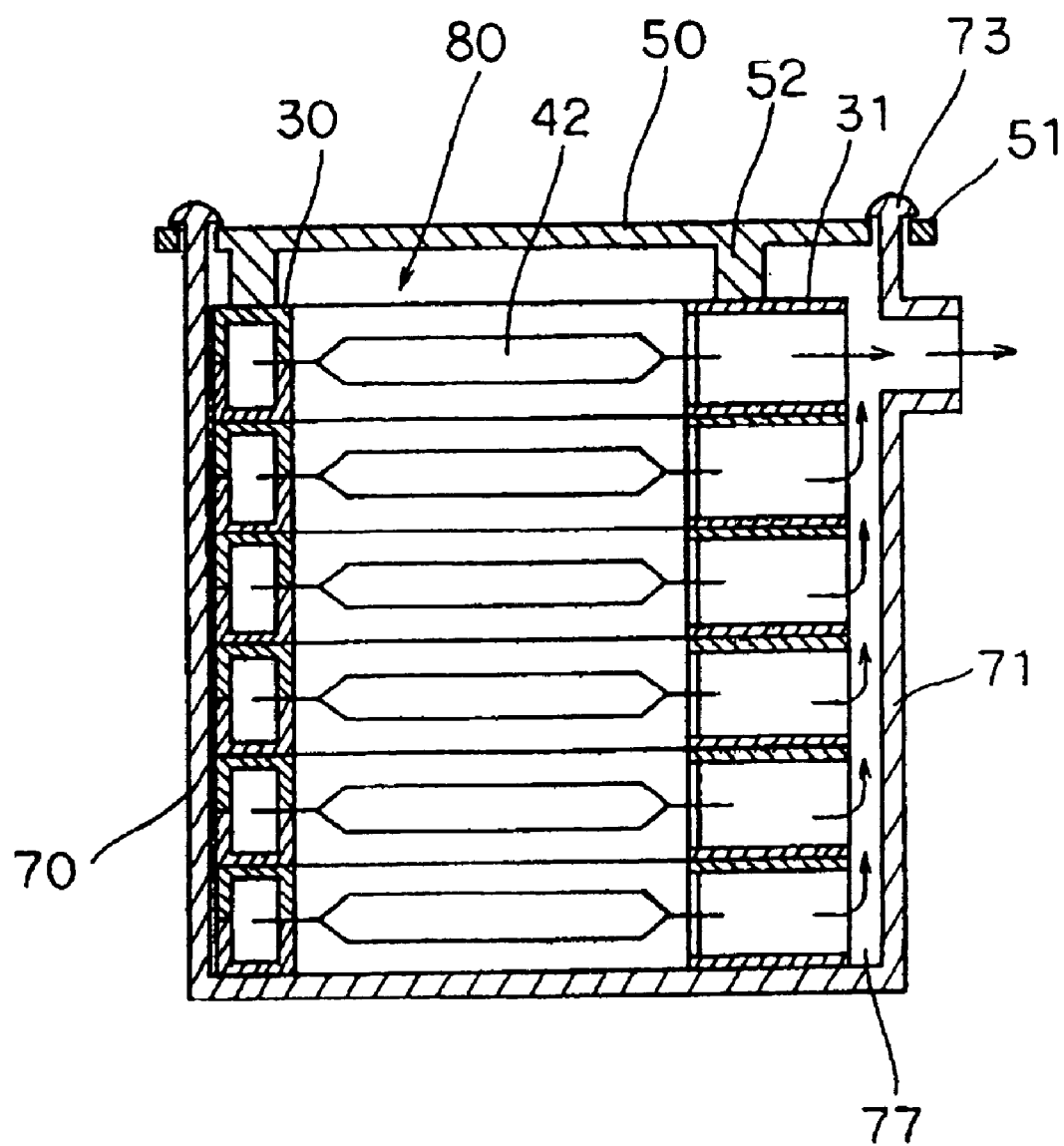
FIG. 8 is a side cross-sectional view of the case that houses the assembled battery shown in FIG. 7.

Next, FIG. 7 is a perspective exploded view of a housing case that can house the laminated battery of the second embodiment. Also, FIG. 8 is a side view of the housing case that houses the assembled battery.

FIG. 7 shows an example in which three layers of laminated batteries 42 held by frame member 30 are stacked to form an assembled battery. The lamination direction is arranged so that exhaust guides 31 of frame members 30 are aligned and stacked to be identical.

Side wall 75 of housing case 70 is shaped along the periphery of frame member 30, and duct 71 is formed at the position corresponding to exhaust guides 31 of frame portion 30. In order to enable connection of the electrode terminals of laminated batteries 42 or electrical connection with the outside, electrode ejection slot 74 is formed so that there is no interference with cathode electrode terminal 43 or anode electrode terminal 44 and side wall 75. Also, side wall 75 is provided with a plurality of projections 73 that are used to fix lid 50 by thermal caulking, at top end 76. Since projections 73 are thermally caulked, as described later, they are preferably made of resin.

Duct 71 is formed so as to continue from bottom 78 to top end 76 of housing case 70, exhaust guides 31 that are aligned are stored in duct 71 when assembled battery 80 is housed in housing case 70. The projection direction length of duct 71 is longer than the projection direction length of exhaust guide 31 so that gas path 77 shown in FIG. 8 is formed between duct 71 and exhaust guide 31 when exhaust guide 31 is housed in duct 71.

Also, ejection port 72 that introduces the gas passing through gas path 77 to the outside of housing case 70 is arranged at the upper portion of duct 71. A pipe or a duct, not shown, is connected to ejection port 72 and the gas is emitted to the outside. According to this arrangement, adverse effects of the emitted gas on the peripheral device arranged near housing case 70 can be prevented.

Attachment surface 53 of lid 50 is provided with pressing portion 52 formed and projected to meet frame member 30. Pressing portion 52 is used to fix assembled battery 80 in housing case 70 by pushing frame member 30 arranged at the uppermost step of assembled battery 80 toward bottom 78 of housing case 70. Therefore, the shape thereof may not coincide with the shape of frame member 30 as long as pressing portion 52 does not directly abut on main surface 42a of electric power generating element 42 and an approximate uniform pressing force can be applied to frame member 30. For example, a ladder member in which frame members 30 are arranged in the long side direction or the short side direction, or a projection member that pushes four corners (or more portions) of frame members 30 from the top to be fixed is also available.

Also, lid 50 is provided with holes 51 that are shaped and corresponded to projections 73 at the positions corresponding to projections 73. After assembled battery 80 is stored in housing case 70, while projections 73 of housing case 70 are inserted into holes 51 of lid 50 and a predetermined pressure is applied to frame member 30 by pressing portion 52, the tip portions of projections 73 are thermally caulked. With this operation, laminated battery 42 held by frame member 30 is fixed and held in housing case 70. Also, since the atmosphere pressure is applied to main surface 42a of electric power generating element 42, the conventional problem in which battery life is partially shortened due to the application of an uneven pressure to the main surface of the electric power generating element does not occur.

Incidentally, in frame member 30 shown in FIG. 6, the portion corresponding to second portion 10g that has a small thickness is not shown, however, the portion that corresponds to second portion 10g may be formed by taking into consideration thermal characteristics when it is formed into an assembled battery.

The second embodiment shows an example in which laminate battery 41 having frame member 30 outside laminate film 47 is stacked and housed in storage case 70. Specifically, first portions 30f of frame member 30 are directly abutted and stacked, however, housing case 70 of the second embodiment can laminate and store laminated batteries 1 whose frame members 10 are arranged inside laminate film 7, as explained in the first embodiment. Incidentally, in this case, first portions 10f of frame portions 10 are not directly abutted, however, first portions 10f of frame portions 10 are substantially abutted and are stacked through laminate film 7.

The invention claimed is:

1. A film covered electric device, comprising:
an electrical device element and a covering film arranged so as to surround said electrical device element wherein:
a frame member surrounds and holds said electrical device element, and said frame member has a first portion with a thickness larger than that of said electrical device element so that a uniform pressure is applied to said electrical device element; and
said frame member has a second portion with a thickness smaller than that of said first portion.

2. The film covered electric device according to claim 1, wherein said frame member is arranged in said covering film.

3. The film covered electric device according to claim 1, wherein said frame member is positioned on the exterior of said covering film.

4. The film covered electric device according to claim 1, wherein an electrode that extends from said electrical device element is fixed to said frame member.

5. The film covered electric device according to claim 4, wherein said frame member that is divided holds said electrode.

6. The film covered electric device according to claim 3, wherein opposite surfaces of said covering film are heat-sealed around said electrical device element, whereby said frame member that is divided holds a heat-sealed area for sealing said electrical device element.

7. The film covered electric device according to claim 3, wherein said frame member has a guide portion for introducing gas that is emitted when internal pressure in an area sealed by said covering film is released.

8. A frame member that is used to fix a film covered electric device, having an electrical device element and a covering film arranged so as to surround said electrical device element in a container, and that is attached to a peripheral portion of said film covered electric device, comprising:
   said frame member having a first portion with a thickness larger than that of said electrical device element and a second portion with a thickness thinner than that of said first portion,
   wherein said frame member is divided to hold a sealing area that seals said electrical device element by heat-sealing opposite-surfaces of said covering film around said electrical device element.

9. The frame member according to claim 8, comprising:
   a guide portion for introducing gas that is emitted when internal pressure in an area sealed by said covering film of said film covered electric device is released.

10. A housing system for a film covered electric device comprising:
    a plurality of said film covered electric devices, wherein said plurality of film covered electric devices are comprised of electrical device elements and covering films arranged so as to surround said electrical device elements,
    a plurality of frame members that surround and hold said electrical device elements of said plurality of film covered electric devices, and said plurality of frame members have a first portion with a thickness larger than that of said electrical device elements, and
    an assembled battery formed by stacking said plurality of frame members that surround and hold said electrical device elements such that an abutting portion of one of said plurality of frame members is abutted with an abutting portion of another one of said plurality of frame members that is adjacent, wherein:
    said abutting portions have a substantial thickness of said first portion; and
    said frame member is positioned on the exterior of said covering film and has a guide portion for leading gas that is emitted when internal pressure in an area sealed by said covering film of said film covered electric device is released, and said container has a duct that concentrates the gases led by said guide portion into at least one place and discharges the gases to the outside of said container.

11. The housing system for a film covered electric device according to claim 10, wherein said container has said duct at a position corresponding to each said guide portion of said frame member in said assembled battery, each of said frame members has said guide portion at a same position.

12. The housing system for a film covered electric device according to claim 10, wherein said container has said duct at a said container side wall.

13. The housing system for a film covered electric device according to claim 10, wherein said container has a lid having a pressing portion that presses said frame member of said assembled battery housed in said container toward a bottom of said container on which said assembled battery is mounted.

14. The housing system for a film covered electric device according to claim 13, wherein a plurality of projections made of resin and formed on a said container side wall are each inserted into a plurality of holes provided in said lid, wherein each of said holes corresponds to each of said projections, each said projection that projects from each said hole is thermally caulked to fix said lid to said container.

15. The housing system for a film covered electric device according to claim 14, wherein said thermal caulking is performed while said pressing portion is pressed to said frame member by a predetermined pressure.

16. The film covered electric device according to claim 1, wherein said uniform pressure is atmospheric pressure.

* * * * *